US012614000B2

(12) United States Patent
Boucard et al.

(10) Patent No.: US 12,614,000 B2
(45) Date of Patent: Apr. 28, 2026

(54) DATA ENCRYPTION FOR DATA TRANSFERS BETWEEN SEMICONDUCTOR DIES USING A KEYSTREAM GENERATOR

(71) Applicant: QUALCOMM Incorporated, San Diego, CA (US)

(72) Inventors: Philippe Boucard, Le Chesnay (FR); Serge Bernard Lasserre, Grasse (FR); Alia Nejim, Antony (FR); Changjian Gao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 18/673,003

(22) Filed: May 23, 2024

(65) Prior Publication Data

US 2025/0363248 A1     Nov. 27, 2025

(51) Int. Cl.
  *G06F 21/72*     (2013.01)
  *G06F 21/60*     (2013.01)
(52) U.S. Cl.
  CPC ............ *G06F 21/72* (2013.01); *G06F 21/606* (2013.01)
(58) Field of Classification Search
  CPC ............................. G06F 21/606; G06F 21/72
  See application file for complete search history.

(56) References Cited

U.S. PATENT DOCUMENTS

| | | | | |
|---|---|---|---|---|
| 8,667,265 | B1 * | 3/2014 | Hamlet | ................. H04L 9/3278 |
| | | | | 713/185 |
| 2022/0229941 | A1 * | 7/2022 | Tang | ........................ G06F 21/85 |
| 2023/0275761 | A1 * | 8/2023 | Kandele | ................ H04L 9/3242 |
| | | | | 713/168 |

OTHER PUBLICATIONS

Anonymous: "Keystream—Wikipedia", Aug. 18, 2021, 2 Pages, XP093275503.
International Search Report and Written Opinion—PCT/US2025/022995—ISA/EPO—May 29, 2025.
PCI Express®, "PCI Express® Base Specification Revision 6.1", 6.1-1.0-PUB, Jul. 12, 2023, 2051 pages.

* cited by examiner

*Primary Examiner* — William S Powers
(74) *Attorney, Agent, or Firm* — Norton Rose Fulbright US LLP

(57)     ABSTRACT
A semiconductor die includes an input interface configured to receive data to be transferred to at least one other semiconductor die. The semiconductor die further includes a keystream generator configured to generate a keystream based on a key and an initial value. The semiconductor die further includes encryption circuitry coupled to the keystream generator. The encryption circuitry is configured to generate a command to initiate decryption and is further configured to generate encrypted data based on the data and the keystream. The semiconductor die further includes an output interface coupled to the encryption circuitry. The output interface is configured to output the command and the encrypted data to a physical interface with the at least one other semiconductor die.

20 Claims, 6 Drawing Sheets

100

500 ⟶

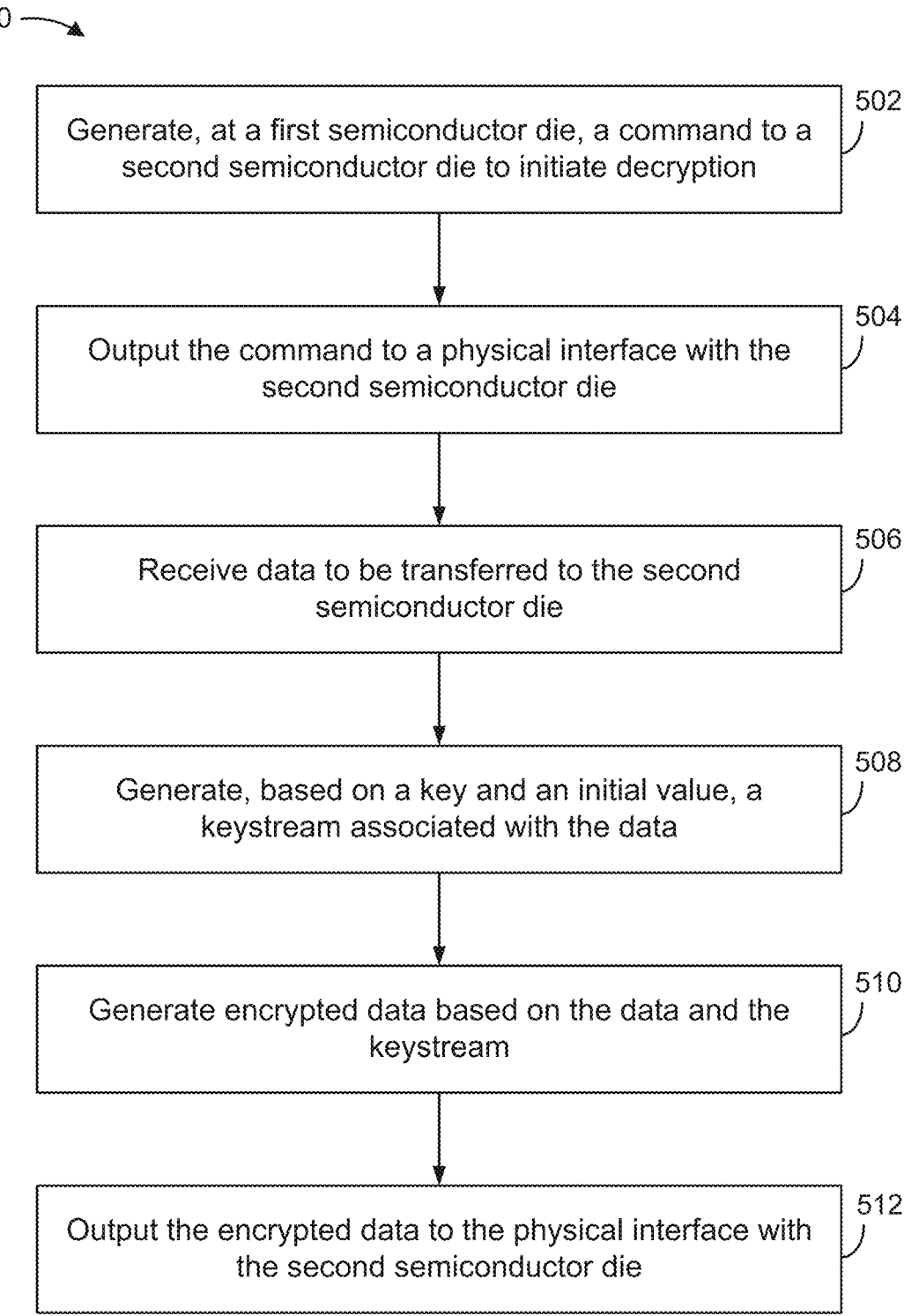

502
Generate, at a first semiconductor die, a command to a second semiconductor die to initiate decryption 504
Output the command to a physical interface with the second semiconductor die 506
Receive data to be transferred to the second semiconductor die 508
Generate, based on a key and an initial value, a keystream associated with the data 510
Generate encrypted data based on the data and the keystream 512
Output the encrypted data to the physical interface with the second semiconductor die

Receive, at a first semiconductor die, a command to initiate decryption from a second semiconductor die        602

Receive encrypted data from the second semiconductor die        604

Generate, based on a key and an initial value, a keystream associated with the data        606

Generate decrypted data based on the data and the keystream        608

DATA ENCRYPTION FOR DATA TRANSFERS BETWEEN SEMICONDUCTOR DIES USING A KEYSTREAM GENERATOR

TECHNICAL FIELD

Aspects of the disclosure relate generally to semiconductor devices, and more particularly, to data transfer between semiconductor devices.

INTRODUCTION

Electronic devices use semiconductor devices to process and store data and to perform other operations. An example of a semiconductor device is a system-on-chip (SoC). An SoC may include multiple different processors or other components, such as processors, memories, controllers, and other components. SoCs and other semiconductor devices may support a wide variety of data processing and storage operations.

The value and use of data continues to increase, as do computational requirements. As a result, the tasks performed by components of a semiconductor device may include processing, compiling, storing, and communicating information for business, personal, or other purposes. Accordingly, SoCs and other semiconductor devices may process and store relatively sensitive data in some cases. Some such devices may use data security techniques to protect such data during their transfer. However, these techniques may increase latency, power consumption, and utilization of device resources (e.g., processing resources, memory resources, and device bandwidth).

BRIEF SUMMARY OF SOME EXAMPLES

In some aspects, a semiconductor die includes an input interface configured to receive data to be transferred to at least one other semiconductor die. The semiconductor die further includes a keystream generator configured to generate a keystream based on a key and an initial value. The semiconductor die further includes encryption circuitry coupled to the keystream generator. The encryption circuitry is configured to generate a command to initiate decryption and is further configured to generate encrypted data based on the data and the keystream. The semiconductor die further includes an output interface coupled to the encryption circuitry. The output interface is configured to output the command and the encrypted data to a physical interface with the at least one other semiconductor die.

In some additional aspects, a semiconductor die includes an input interface configured to receive encrypted data from at least one other semiconductor die via a physical interface. The semiconductor die further includes a keystream generator configured to generate, based on a key and an initial value, a keystream associated with the encrypted data. The semiconductor die further includes decryption circuitry coupled to the keystream generator. The decryption circuitry is configured to receive a command to initiate decryption and further configured to output decrypted data based on the encrypted data, the keystream, and the command.

In some further aspects, a method includes generating, at a first semiconductor die, a command to a second semiconductor die to initiate decryption and outputting the command to a physical interface with the second semiconductor die. The method further includes receiving data to be transferred to the second semiconductor die and generating, based on a key and an initial value, a keystream associated with the data. The method further includes generating encrypted data based on the data and the keystream and outputting the encrypted data to the physical interface with the second semiconductor die.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.).

BRIEF DESCRIPTION OF THE DRAWINGS

FIG. 5 is a flow chart illustrating an example of a method according to some aspects of the disclosure.

Like reference numbers and designations in the various drawings indicate like elements.

DETAILED DESCRIPTION

Figure 1:
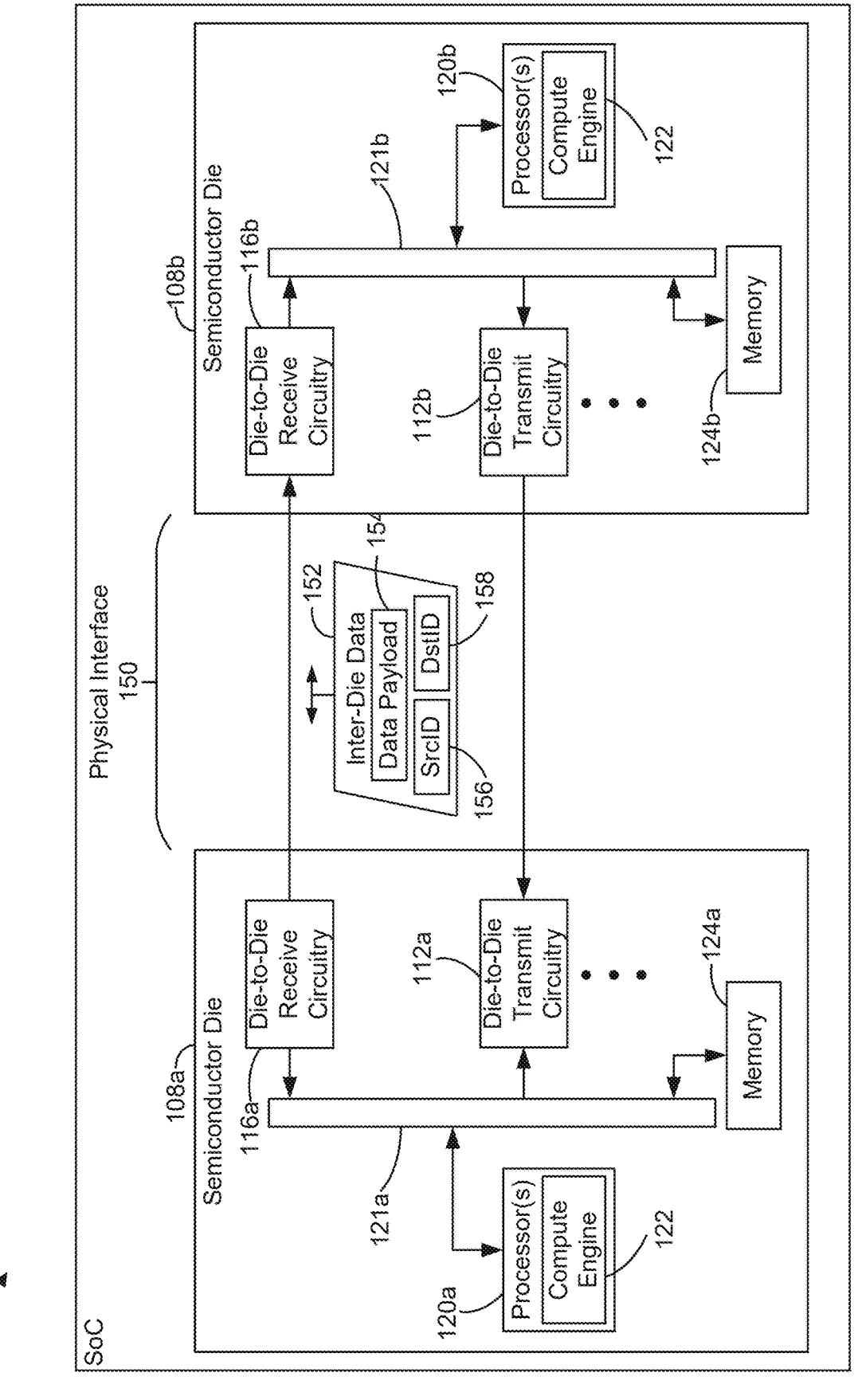
FIG. 1 is a diagram illustrating an example of a system-on-chip (SoC) according to some aspects of the disclosure.

According to some aspects of the disclosure, a system-on-chip (SoC) may include multiple semiconductor dies and a compute engine that is distributed (or "split") among at least some of the semiconductor dies. In some examples, such a semiconductor die may include or may be referred to as a chiplet. The semiconductor dies may communicate with one another via one or more physical interfaces. For example, the compute engine may transfer data across the semiconductor dies using the one or more physical interfaces. In some aspects, data to be transferred among the semiconductor dies may be secured using a relatively low-overhead encryption scheme. For example, the semiconductor dies may each include a keystream generator that encrypts data in accordance with a key, such as a symmetric encryption key. The key may be shared by the semiconductor dies. The encryption scheme may enable sharing of data among the semiconductor dies while introducing a low amount of latency, bandwidth overhead, and power consumption.

In some examples, encryption may be enabled and disabled using a low-overhead command that is transmitted via a physical interface between semiconductor dies that is also used to transfer data between the semiconductor dies. The command may correspond to a START/STOP command that is configured to enable and disable decryption and to initiate or synchronize operation of decryption circuitry of a semiconductor die receiving the encrypted data. In some examples, the physical interface may comply with a protocol, and the command may optionally include a particular sequence of bits that is disallowed (or "illegal") for the protocol. In some other examples, the command may optionally include another sequence of bits, such as a sequence that is allowed (or "legal") for the protocol. The command may include an unencrypted sequence of bits.

In some examples, decryption may be initiated or synchronized using the command and without use of time-based information (e.g., timestamps or other metadata) that may increase latency, overhead, and power consumption while also avoiding potential race conditions that may be associated with other techniques (such as some timestamp-based techniques). To illustrate, in some aspects of the disclosure, potential race conditions may be avoided by sending the command using the same physical interface as the data to be transferred (and by stalling the data while the command is being transmitted). Further, in some examples, performance may be similar for transmission (and reception) of both encrypted data and non-encrypted data. As a result, data communicated among the semiconductor dies may be secured without increasing (or without substantially increasing) data transfer latency and utilization of device resources (e.g., processing resources, memory resources, and device bandwidth) and while mitigating any increase in power consumption (e.g., where a marginal increase in traffic overhead due to the command is associated with a relatively low increase in power consumption). In some implementations, the impact of encryption on power consumption may be further reduced or mitigated by optionally using selective encryption (e.g., by selectively activating and deactivating encryption), as described further below.

FIG. 1 is a diagram illustrating an example of a multi-die system-on-chip (SoC) 100 according to some aspects of the disclosure. The multi-die SoC 100 may include multiple semiconductor dies, such as a semiconductor die 108a and a semiconductor die 108b. In some examples, the semiconductor die 108a and the semiconductor die 108b may each include or may each be referred to as a chiplet.

Each semiconductor die of the multi-die SoC 100 may include die-to-die transmit circuitry and die-to-die receive circuitry. In some implementations, a semiconductor die optionally may also include one or more processors, one or more memories, or both one or more processors and one or more memories. For example, the semiconductor die 108a may include die-to-die transmit circuitry 112a, die-to-die receive circuitry 116a, one or more processors 120a, and a memory 124a. As another example, the semiconductor die 108b may include die-to-die transmit circuitry 112b, die-to-die receive circuitry 116b, one or more processors 120b, and a memory 124b.

In some implementations, a semiconductor die may optionally include an interconnect (or one or more other structures) coupling at least some components of the semiconductor die to one another. For example, the semiconductor die 108a may optionally include an interconnect 121a coupled to the die-to-die transmit circuitry 112a, the die-to-die receive circuitry 116a, the one or more processors 120a, and the memory 124a. As another example, the semiconductor die 108b may optionally include an interconnect 121b coupled to the die-to-die transmit circuitry 112b, the die-to-die receive circuitry 116b, the one or more processors 120b, and the memory 124b. Other examples are also within the scope of the disclosure.

Semiconductor dies of the multi-die SoC 100 may be coupled to one another via one or more physical interfaces. For example, the semiconductor die 108a may be coupled to the semiconductor die 108b via a physical interface 150. The physical interface 150 may include, for example, a die-to-die (D2D) link. In one example, the physical interface 150 may include a first bus that couples the die-to-die transmit circuitry 112a to the die-to-die receive circuitry 116b and may further include a second bus that couples the die-to-die transmit circuitry 112b to the die-to-die receive circuitry 116a. Other examples are also within the scope of the disclosure.

During operation, the processors 120a, 120b may each perform one or more operations. Further, the processors 120a, 120b may share data, such as inter-die data 152. Sharing data may include, as non-limiting examples, data transfer from a processor to another processor, data transfer from a memory to a processor, data transfer from a processor to a memory, or another type of data transfer. In some examples, the inter-die data 152 may include one or more of a data payload 154, a source identifier (ID) 156, a destination ID 158, or other information. The source ID 156 may include an indication of one of the semiconductor dies 108a-b, and the destination ID 158 may include an indication of the other of the semiconductor dies 108a-b.

To illustrate, in some examples, the one or more processors 120a may generate the inter-die data 152 and may transmit the inter-die data 152 to the one or more processors 120b via the die-to-die transmit circuitry 112a. The one or more processors 120b may receive the inter-die data 152 via the die-to-die receive circuitry 116b. In some other examples, the one or more processors 120b may generate the inter-die data 152 and may transmit the inter-die data 152 to the one or more processors 120a via the die-to-die transmit circuitry 112b. The one or more processors 120a may receive the inter-die data 152 via the die-to-die receive circuitry 116a.

In some examples, the semiconductor dies 108a-b may exchange the inter-die data 152 in connection with operation of a compute engine 122, such as to facilitate data synchronization of data among the processors 120a-b. In such examples, the inter-die data 152 may be exchanged via the physical interface 150 in connection with a data synchronization operation between the processors 120a-b. In some other examples, the inter-die data 152 may be provided from one of the semiconductor dies 108a-b to the other of the semiconductor dies 108a-b in connection with a memory read operation or a memory write operation. To illustrate, the semiconductor die 108a may send the inter-die data 152 to the semiconductor die 108b in connection with a request to write the data payload 154 to the memory 124b, or the semiconductor die 108b may send the inter-die data 152 to the semiconductor die 108a in connection with a request to read the data payload 154 from the memory 124a. Other examples are also within the scope of the disclosure.

Although the example of FIG. 1 illustrates that the multi-die SoC 100 may include two semiconductor dies, in other examples, the multi-die SoC 100 may include more than two semiconductor dies. Further, in some implementations, each such semiconductor die may include a respective pair of transmit and receive circuitry for each other semiconductor die of the multi-die SoC 100. Other examples are also within the scope of the disclosure. For example, in some implementations, a semiconductor die may include multiple pairs of transmit and receive circuitry for communication with another semiconductor die.

In some aspects of the disclosure, to increase data security associated with the inter-die data 152, the die-to-die transmit circuitry 112a-b may perform data encryption of data (such as the inter-die data 152), and the die-to-die receive circuitry 116a-b may perform data decryption of such data. Some illustrative examples that may be associated with data encryption are described further with reference to FIG. 2.

Figure 2:
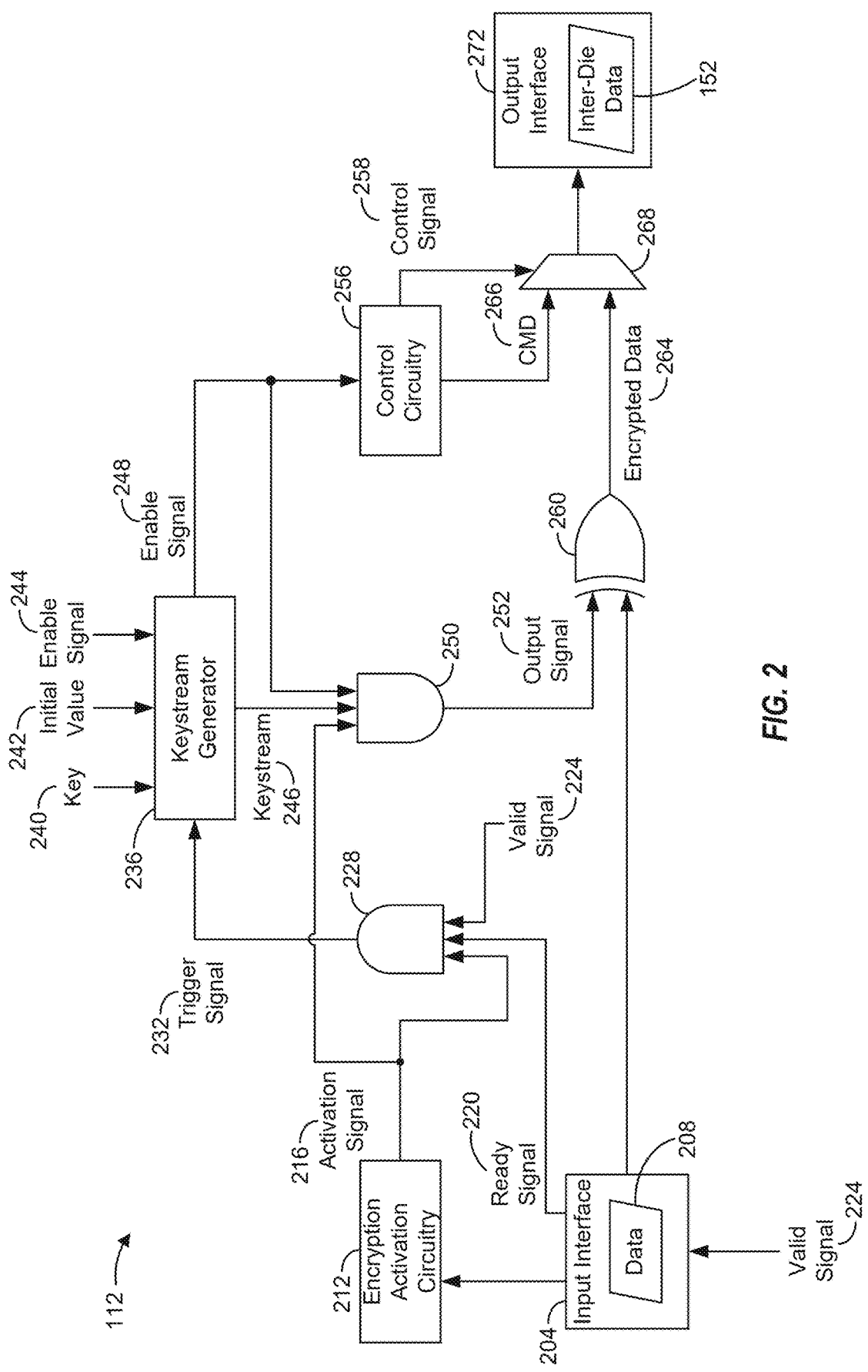
FIG. 2 is a diagram illustrating an example of die-to-die transmit circuitry according to some aspects of the disclosure.

FIG. 2 is a diagram illustrating an example of die-to-die transmit circuitry 112 according to some aspects of the disclosure. In some examples, the die-to-die transmit circuitry 112 of FIG. 2 may correspond to the die-to-die transmit circuitry 112a or the die-to-die transmit circuitry 112b of FIG. 1.

The die-to-die transmit circuitry 112 may include or may be coupled to an input interface 204. In some examples, the input interface 204 may include a buffer, and the buffer may be coupled to one or more processors or other components (such as the processor 120a of FIG. 1).

The die-to-die transmit circuitry 112 may further include encryption activation circuitry 212, a trigger generation circuit 228, and a keystream generator 236. The encryption activation circuitry 212 may be coupled to the input interface 204. The trigger generation circuit 228 may be coupled to the encryption activation circuitry 212 and to the keystream generator 236. In some examples, the trigger generation circuit 228 may include an AND gate. Other examples are also within the scope of the disclosure.

The die-to-die transmit circuitry 112 may further include an mode selection circuit 250, and control circuitry 256. The mode selection circuit 250 may be coupled to the keystream generator 236 and to the encryption activation circuitry 212. The control circuitry 256 may be coupled to the keystream generator 236 and to the mode selection circuit 250. In some examples, the mode selection circuit 250 may include an AND gate. Other examples are also within the scope of the disclosure.

The die-to-die transmit circuitry 112 may also include an encryption circuit 260, a multiplexer (MUX) 268, and an output interface 272. The encryption circuit 260 may be coupled to the mode selection circuit 250 and the MUX 268. The MUX 268 may be coupled to the control circuitry 256, the encryption circuit 260, and the output interface 272. In some examples, the output interface 272 may include a buffer or an output terminal of the semiconductor die 108a. The output interface 272 may include or may be coupled to the physical interface 150 of FIG. 1. In some examples, the encryption circuit 260 may include an exclusive-OR (XOR) gate. Other examples are also within the scope of the disclosure.

To further illustrate, in some implementations, an output of the mode selection circuit 250 may be coupled to an input of the encryption circuit 260. The encryption circuit 260 may include a first input coupled to the input interface 204, a second input coupled to the output of the mode selection circuit 250, and an output coupled to an input of the MUX 268. An output of the MUX 268 may be coupled to the output interface 272.

Although some examples herein may depict a single connection (such as a wire) among some components, it is noted that, in some implementations, one or more such illustrated wireless may include a bus or another structure. In some examples, such a bus may be configured to carry a multi-bit signal, such as a signal of $2^N$ bits, where N indicates a positive integer. In some examples, a signal described herein may include a particular number of bits (such as $2^N$ bits), and one or more logic gates (such as the mode selection circuit 250 and the encryption circuit 260) may each include a set of logic gates (such as $2^N$ logic gates) each associated with a respective bit of the signal.

During operation, the input interface 204 may receive data 208 to be output via the output interface 272. For example, in some implementations, the one or more processors 120a may write the data 208 to the input interface 204 in connection with a request to transfer the data 208 to the semiconductor die 108b of FIG. 1.

The keystream generator 236 may receive one or more of a key, an initial value 242 (e.g., a counter initial value), and an enable signal 244. In an example, a semiconductor die may serve as a security master and may send information that enables generation of the key 240 on other semiconductor dies. In some examples, one or more of the key 240, the initial value 242, or the enable signal 244 may each be received via a respective register that may be coupled to the keystream generator 236.

The keystream generator 236 may include or may operate in accordance with the key 240 (e.g., a symmetric encryption key). In some examples, the keystream generator 236 may be configured to operate based on the key 240 and counter and in accordance with an Advanced Encryption Standard (AES) and counter mode protocol.

The keystream generator 236 may generate a new key on the keystream 246 for each new data to be encrypted. Following setting of the enable signal 244 and once the first key of the keystream 246 is ready, the keystream generator 236 may also generate an enable signal 248 and may provide the enable signal 248 to the control circuitry 256 and to the mode selection circuit 250. The keystream generator 236 may provide the keystream 246 to the mode selection circuit 250.

The mode selection circuit 250 may receive the keystream 246 (e.g., via a first input of the mode selection circuit 250) from the keystream generator 236. The mode selection circuit 250 may also receive the enable signal 248 (e.g., via a second input of the mode selection circuit 250) from the keystream generator 236. In some implementations, the encryption activation circuitry 212 may output an activation signal 216 to the mode selection circuit 250 to determine whether encryption is enabled for the data 208, and the mode selection circuit 250 may receive the activation signal 216 (e.g., via a third input of the mode selection circuit 250). Some illustrative examples that may be associated with the encryption activation circuitry 212 and the activation signal 216 are described further with reference to FIG. 3.

The mode selection circuit 250 may generate an output signal 252 based on at least the keystream 246 and the enable signal 248. Further, in some implementations, the mode selection circuit 250 may generate the output signal 252 further based on the activation signal 216. The mode selection circuit 250 may provide the output signal 252 to the encryption circuit 260 via an output of the mode selection circuit 250.

The encryption circuit 260 may receive the data 208 via a first input of the encryption circuit 260 and may receive the output signal 252 via a second input of the encryption circuit 260. In some examples, the encryption circuit 260 may generate encrypted data 264 based on the data 208 and the output signal 252, such as by performing an operation (e.g., an XOR operation) based on the data 208 and the output signal 252. To illustrate, if the output signal 252 is associated with a logic value other than zero, then performing the operation based on the data 208 and the output signal 252 may generate the encrypted data 264. In some other examples, the encryption circuit 260 may generate unencrypted data, such as the data 208. For example, if the activation signal 216 has a logic zero value, then the output signal 252 may be associated with a logic value of zero, and performing the operation based on the data 208 and the output signal 252 may cause the encryption circuit 260 to output the data 208 (e.g., unencrypted data).

The MUX 268 may receive the encrypted data 264 (or non-encrypted data, such as the data 208) via the output of the encryption circuit 260 and via a first input of the MUX 268. The MUX 268 may receive a command 266 from the control circuitry 256 (e.g., via a second input of the MUX 268). In some implementations, the command 266 may indicate to initiate decryption of the encrypted data 264. For example, prior to sending the encrypted data 264 to the semiconductor die 108*b*, the semiconductor die 108*a* may send the command 266 to the semiconductor die 108*b* to indicate that the semiconductor die 108*b* is to initiate decryption of the encrypted data 264 (upon receiving the encrypted data 264). In some examples, the command 266 may correspond to a START/STOP command that is configured to enable and disable decryption and to synchronize operation of decryption circuitry of a semiconductor die receiving the inter-die data 152. To further illustrate, the control circuitry 256 may enable encryption (and decryption) via the control signal 258 based on a transition of the enable signal 248 from a first value (such as a logic zero value) to a second value (such as a logic one value) and may disable encryption (and decryption) via the control signal 258 based on a transition of the enable signal 248 from the second value to the first value. In some examples, the physical interface 150 of FIG. 1 may operate based on a protocol, and the command 266 may include a particular sequence of bits that is disallowed (or "illegal") for the protocol. In some other examples, the command 266 may include another sequence of bits, such as a sequence that is allowed (or "legal") for the protocol. In some examples, the physical interface 150 may correspond to a chip-to-chip (C2C) interface, and the protocol may correspond to a C2C protocol.

The MUX 268 may output one of the command 266, the encrypted data 264, or unencrypted data (such as the data 208) to the output interface 272 (e.g., based on a control signal 258 provided by the control circuitry 256). In some examples, the control circuitry 256 may receive the enable signal 248 and may generate the control signal 258 based on the enable signal 248. In some examples, encrypted data may be referred to as cyphered data, and unencrypted data may be referred to as plain data.

The output interface 272 may receive one of the command 266, the encrypted data 264, or unencrypted data (such as the data 208) from the output of the MUX 268. The output interface 272 may output such data to the physical interface 150 with the semiconductor die 108*b*. The data may include the inter-die data 152, which may include or correspond to the encrypted data 264, the data 208 (e.g., where encryption is deactivated via the activation signal 216), or the command 266. In some examples, data may be stalled while the command 266 is sent.

Further, in some examples, the trigger generation circuit 228 may receive the activation signal 216, a ready signal 220, and a valid signal 224. The trigger generation circuit 228 may output a trigger signal 232 based on the activation signal 216, the ready signal 220, and the valid signal 224. In some implementations, the keystream generator 236 may initiate generating the keystream 246 based at least in part on the trigger signal 232.

Accordingly, the example of FIG. 2 illustrates encryption circuitry that may be configured to generate the command 266 to initiate decryption and then to generate the encrypted data 264 based on the data 208 and the keystream 246 or to generate the command 266 to stop decryption then to generate plain data based on data 208. The encryption circuitry may include, for example, any of the encryption activation circuitry 212, the trigger generation circuit 228, the mode selection circuit 250, the control circuitry 256, the encryption circuit 260, or the MUX 268. The encryption circuitry may be configured to cause the keystream generator 236 to generate, for each subsequent data set to be encrypted and transmitted via physical interface 150, a subsequent keystream associated with the subsequent data set.

Figure 3:
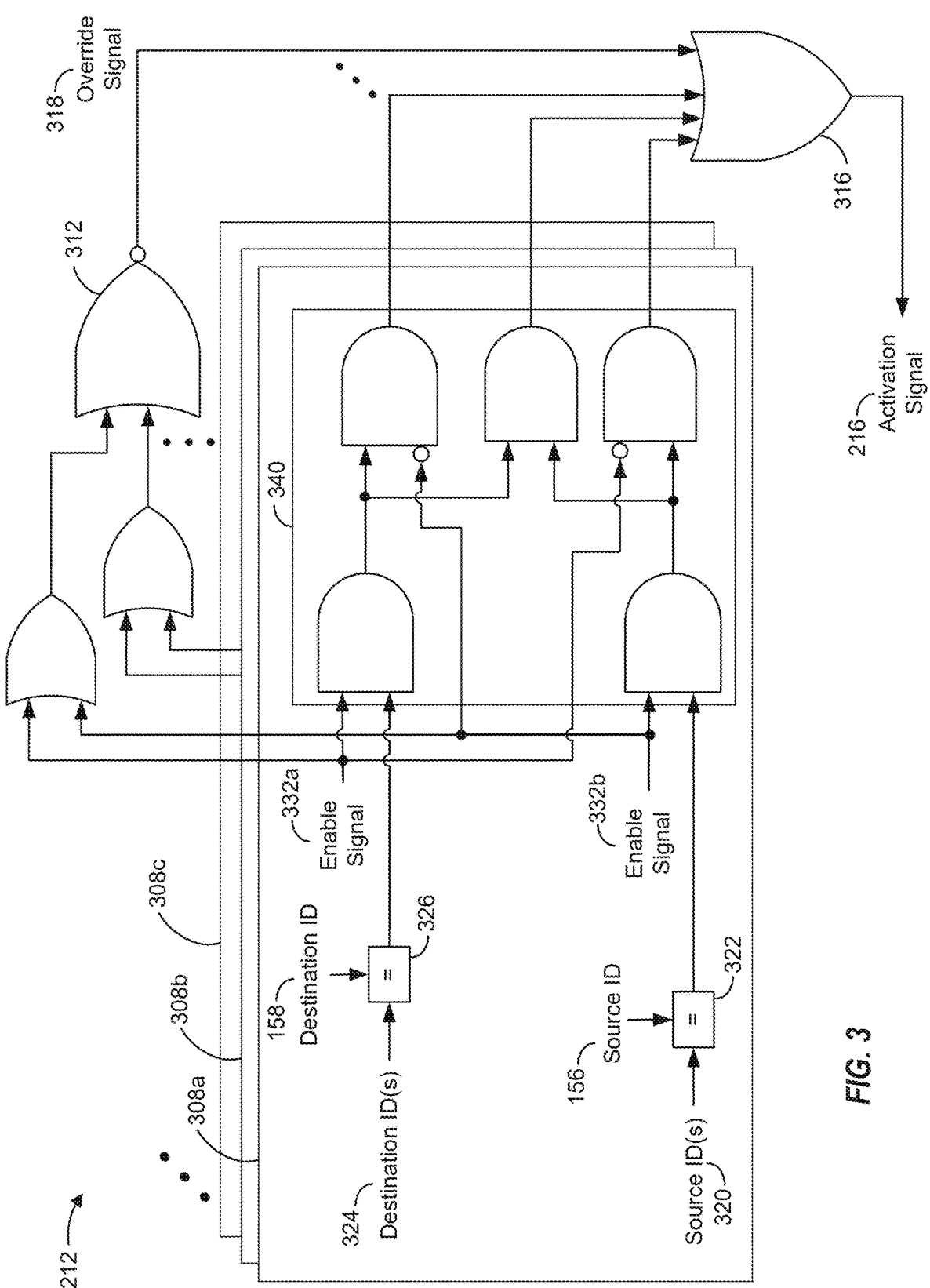
FIG. 3 is a diagram illustrating an example of encryption activation circuitry according to some aspects of the disclosure.

FIG. 3 is a diagram illustrating an example of the encryption activation circuitry 212 according to some aspects of the disclosure. In some examples, the encryption activation circuitry 212 may include, or may be referred to as, an activation condition detection circuit.

In some implementations, each activation condition detection circuit may include one or more match detection circuits 308*a-c*, an override circuit 312 coupled to the one or more match detection circuits 308*a-c*, and an activation circuit 316 coupled to the override circuit 312 and to the one or more match detection circuits 308*a-c*. In some examples, the override circuit 312 may include a not-OR (NOR) gate, and the activation circuit 316 may include an OR gate. Other examples are also within the scope of the disclosure.

In some examples, each match detection circuit may include one or more comparators and circuitry (e.g., one or more AND gates) coupled to the one or more comparators. For example, the match detection circuit 308*a* may include a comparator 322, a comparator 326, and circuitry 340 coupled to the comparators 322 and 326. Further, the circuitry 340 may be coupled to the activation circuit 316.

During operation, each match detection circuit may identify whether data satisfies one or more encryption activation criteria. To illustrate, in the example of FIG. 2, the match detection circuit 308*a* may receive the source ID 156 and the destination ID 158 of the data 208 and may compare the source ID 156 and the destination ID 158 to one or more predetermined source IDs 320 and to one or more predetermined destination IDs 324, respectively.

Based on the data 208 satisfying the one or more encryption activation criteria (e.g., based on the source ID 156 matching the one or more predetermined source IDs 320, the destination ID 158 matching the one or more predetermined destination IDs 324, or both), one or more of the match detection circuits 308*a-c* may output signals indicating logic one values to the activation circuit 316. Further, operation may be based at least in part on enable signals associated with match detection circuits 308*a-c* (such as enable signal 332*a-b*), which may determine an output of the override circuit 312 provided to the activation circuit 316. To illustrate, if each enable signal 332*a-b* is set to a logic zero value, then the override circuit 312 may generate an override signal 318 having a logic one value, and the activation signal 216 may be set to a logic one value (e.g., to disable partial encryption by overriding selective matching performed by the match detection circuits 308*a-c*). Accordingly, if at least one input to the activation circuit 316 has a logic one value, the activation signal 216 may have a logic one value to indicate that encryption (and decryption) is to be activated (e.g., enabled) for the data 208.

In some other examples, based on the data 208 failing to satisfy the one or more encryption activation criteria (e.g., based on the source ID 156 failing to match the one or more predetermined source IDs 320 and the destination ID 158 failing to match the one or more predetermined destination IDs 324), one or more of the match detection circuits 308*a-c* may output signals indicating logic zero values to the activation circuit 316. If each input to the activation circuit 316 has a logic zero value, the activation signal 216 may have a logic zero value to indicate that encryption (and decryption) is to be deactivated (e.g., disabled) for the data 208.

Accordingly, in some implementations, encryption may be selectively enabled for data based on the data satisfying one or more encryption activation criteria. In some examples, such encryption activation criteria may include the one or more predetermined source IDs 320 and the one or more predetermined destination IDs 324. To further illustrate, in some examples, the one or more predetermined destination IDs 324 may specify that data from one component (such as a source "A") is to be encrypted, or data to be transmitted to another component (such as a destination "B") is to be encrypted. In another example, data from one component (such as source "C") to another component (such as destination "D") may be encrypted, and other data may be unencrypted. Other examples are also within the scope of the disclosure. For example, the one or more encryption activation criteria may include a memory address (or memory address range), an opcode type, one or more other conditions, or a combination thereof. In some implementations, selectively enabling encryption may reduce power consumption (e.g., by enabling one or more components to be paused or operated in a low power mode of operation). Accordingly, the keystream generator 236 may be configured to enable transferred data over a die-to-die (D2D) link (e.g., the physical interface 150) to be fully encrypted or selectively encrypted.

Figure 4:
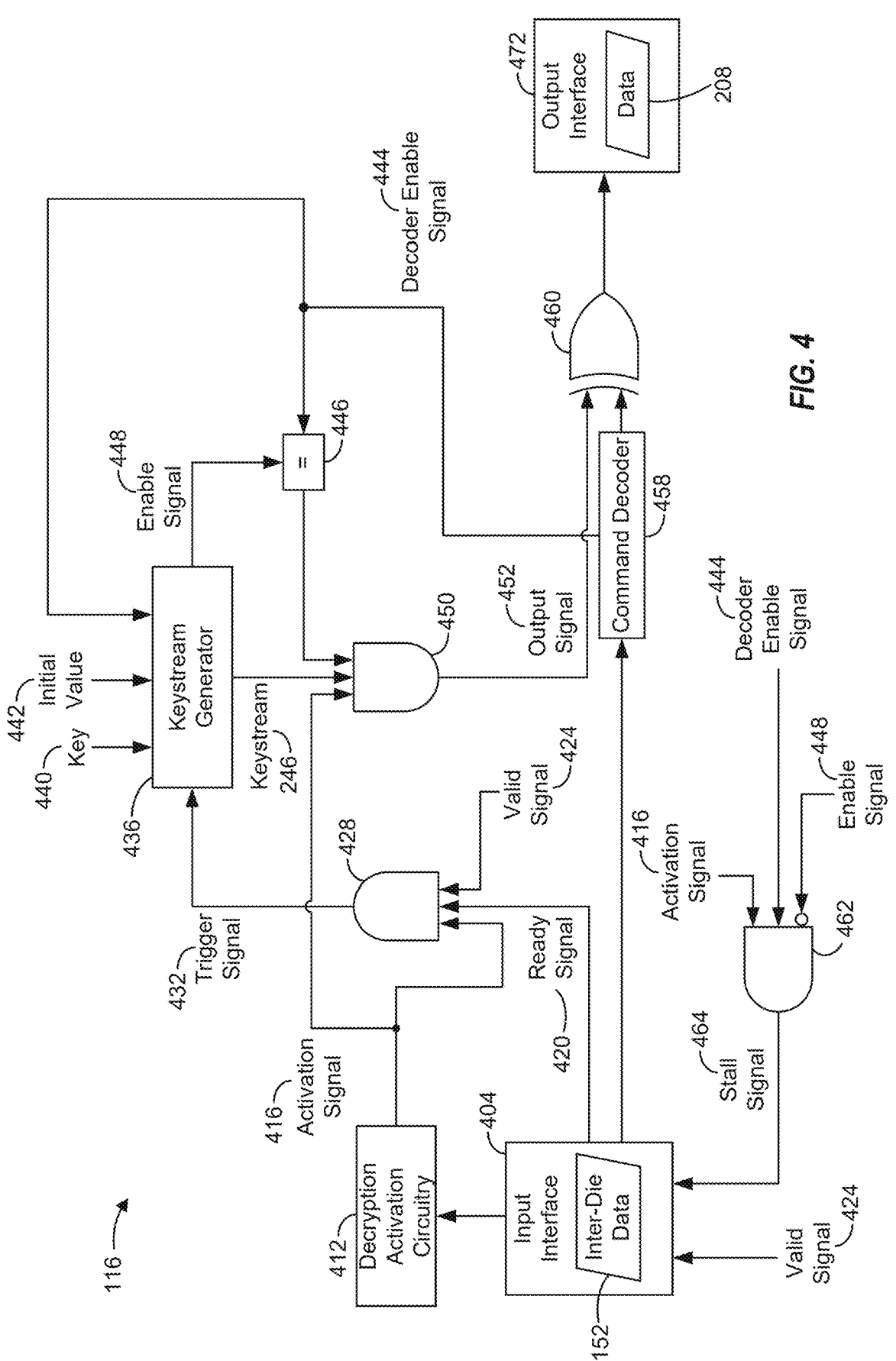
FIG. 4 is a diagram illustrating an example of die-to-die receive circuitry according to some aspects of the disclosure.

FIG. 4 is a diagram illustrating an example of die-to-die receive circuitry 116 according to some aspects of the disclosure. In some examples, the die-to-die receive circuitry 116 of FIG. 4 may correspond to the die-to-die receive circuitry 116a or the die-to-die receive circuitry 116b of FIG. 1.

In some examples, die-to-die receive circuitry 116a may include an input interface 404. The input interface 404 may include or may be coupled to the physical interface 150 of FIG. 1. In some implementations, a stall circuit 462 may be coupled to the input interface 404. In some examples, the stall circuit 462 may include an AND gate and an inverter coupled to an input of the AND gate. Other examples are also within the scope of the disclosure.

The die-to-die receive circuitry 116 may further include decryption activation circuitry 412, a trigger generation circuit 428, and a keystream generator 436. The decryption activation circuitry 412 may be coupled to the input interface 404. The trigger generation circuit 428 may be coupled to the input interface 404, the decryption activation circuitry 412, and the keystream generator 436. In some examples, the trigger generation circuit 428 may include an AND gate. Other examples are also within the scope of the disclosure. In some examples, components and operation of the decryption activation circuitry 412 may correspond to components and operation of the encryption activation circuitry 212.

The die-to-die receive circuitry 116 may further include a mode selection circuit 450, a comparator 446, a command decoder 458, and an decryption circuit 460. The mode selection circuit 450 may be coupled to the keystream generator 436, to the decryption activation circuitry 412, and to the comparator 446. The decryption circuit 460 may include a first input coupled to the input interface 404 and may further include a second input coupled to the command decoder 458. The command decoder 458 may be coupled to the comparator 446 and to the keystream generator 436. In some examples, the mode selection circuit 450 may include an AND gate, and the decryption circuit 460 may include an XOR gate. Other examples are also within the scope of the disclosure.

The die-to-die receive circuitry 116 may also include an output interface 472. The output interface 472 may be coupled to an output of the decryption circuit 460. In some examples, the output interface 472 may include a buffer, and the buffer may be coupled to one or more processors or other components (such as the processor 120b of FIG. 1).

During operation, the input interface 404 may receive the command 266 (e.g., via the physical interface 150). In some implementations, the inter-die data 152 may include, for example, the command 266, the encrypted data 264, or unencrypted data, such as the data 208 of FIG. 2.

The input interface 404 may receive the inter-die data 152 and may output the inter-die data 152 to the decryption circuit 460. The decryption circuit 460 may receive the inter-die data 152 via a first input of the decryption circuit 460. In some examples, the inter-die data 152 may include the command 266, and the command decoder 458 may detect the command 266 (e.g., by matching a specific bit sequence of the inter-die data 152 to a predetermined bit sequence) and may output a decoder enable signal 444 based on detecting the command 266.

The trigger generation circuit 428 may output a trigger signal 432. For example, the trigger generation circuit 428 may output the trigger signal 432 based on an activation signal 416 generated by the decryption activation circuitry 412, a ready signal 420, and a valid signal 424.

The keystream generator 436 may receive the trigger signal 432 and an initial value 442 (e.g., the initial value 242). Based on the trigger signal 432, the initial value 442, and a key 440 (e.g., the key 240), the keystream generator 436 may generate the keystream 246. In some examples, the keystream generator 436 may be configured to generate the keystream 246 based on the key 440 and in accordance with an Advanced Encryption Standard (AES) protocol. The keystream generator 436 may also generate an enable signal 448, which may be provided to the comparator 446.

The mode selection circuit 450 may receive the activation signal 416 (e.g., via the first input of the mode selection circuit 450). The mode selection circuit 450 may also receive the keystream 246 (e.g., via a second input of the mode selection circuit 450) and a comparison result from the comparator 446 (e.g., via a third input of the mode selection circuit 450). In some examples, the comparator 446 may generate the comparison result based on the decoder enable signal 444 matching the enable signal 448 (e.g., by detecting that both the decoder enable signal 444 and the enable signal 448 have a logic one value). The mode selection circuit 450 may generate an output signal 452 based on the activation signal 416, the keystream 246, and the comparison result. In some implementations, the stall circuit 462 may generate a stall signal 464 based on the activation signal 416 and the decode enable signal 444 being set and further based on the enable signal 448 not being set.

The input interface 404 may receive the inter-die data 152 (e.g., via the physical interface 150). The input interface 404 may provide the inter-die data 152 to the decryption circuit 460. The decryption circuit 460 may receive the inter-die data 152 (e.g., via the first input of the decryption circuit 460). The decryption circuit 460 may also receive the output signal 452 (e.g., at a second input of the decryption circuit 460) from an output of the mode selection circuit 450. The decryption circuit 460 may output the data 208, such as by performing an operation (e.g., an XOR operation) based on the inter-die data 152 and the output signal 452.

Further, it is noted that the decryption activation circuitry 412 may enable or disable decryption in accordance with one or more decryption activation criteria, which may correspond to the one or more encryption activation criteria described with reference to FIG. 3.

Accordingly, the example of FIG. 4 illustrates that the die-to-die receive circuitry 116 may include decryption circuitry configured to receive the command 266 to initiate decryption and to output decrypted data (e.g., the data 208) based on encrypted data (e.g., the inter-die data 152, which may include the encrypted data 264 of FIG. 2), the keystream 246, and the command 266. In some examples, the decryption circuitry may include one or more of the decryption activation circuitry 412, the trigger generation circuit 428, the mode selection circuit 450, the command decoder 458, or the decryption circuit 460. The decryption circuitry may be configured to decode the command 266 and to enable or disable decryption of data based on the command 266. The decryption circuitry may include or may be coupled to a stall circuit (such as the stall circuit 462) that is configured to receive the activation signal 416 and to generate, in accordance with the activation signal 416, the stall signal 464 when decryption is enabled and the keystream 246 is not ready.

Although some examples may be described with reference to a single keystream 246, in some other examples, multiple keystreams may be used. For example, a new keystream may be generated for each data set to be transmitted between semiconductor dies of the multi-die SoC 100 of FIG. 1. An example of a data set may include a flow control unit (flit). In such examples, the data 208 may correspond to a first flit that is associated with the keystream 246. A second flit may be associated with a second keystream different than the keystream 246.

Further, some features may be omitted or simplified in the drawings for clarity. To illustrate, at least some values or signals may be provided using one or more control registers. For example, although the keystream generator 236 and the keystream generator 436 may receive the same key (e.g., where the key 240 corresponds to the key 440) and the same initial value 242 (e.g., where the initial value 242 corresponds to the initial value 442), it should be appreciated that the keystream generator 236 and the keystream generator 436 may be included in different respective semiconductor dies and may receive the key 240 and the initial value 242 from different respective control registers.

In some implementations, one or more signals or parameters described herein may be generated by the compute engine 122, by one or more other components or devices, or a combination thereof. For example, the compute engine 122 may generate data to be transferred and the valid signal 424. The ready signals 220, 420 may indicate whether a transfer target is ready to accept the valid data. For example, a ready signal may be generated by a memory of the other die and propagated through networks-on-chips (NoCs) of the dies and the physical interface 150. In some examples, one or more of the key 240, the initial value 242, and the enable signal 244 may be programmed by software via another route than the data to be transferred across dies. Other examples are also within the scope of the disclosure.

One or more features described herein may enable data security while avoiding or reducing an increase in latency, power consumption, and utilization of device resources (e.g., processing resources, memory resources, and device bandwidth). To illustrate, encryption and decryption may be synchronized among the semiconductor dies 108*a-b* in a time-independent manner. For example, encryption and decryption may be synchronized at the semiconductor dies 108*a-b* using the command 266 and without the use of time-based information (e.g., timestamps or other metadata) that may increase latency, overhead, and power consumption while also avoiding potential race conditions. Further, in some examples, performance may be similar for transmission (and reception) of both encrypted data and non-encrypted data. As a result, data communicated among the semiconductor dies 108*a-b* (such as the inter-die data 152) may be secured while avoiding or reducing an increase in latency, power consumption, and utilization of resources of the multi-die SoC 100 (e.g., processing resources, memory resources, and device bandwidth).

FIG. 5 is a flow chart illustrating an example of a method 500 according to some aspects of the disclosure. In some examples, operations of the method 500 may be performed by a first semiconductor die, such as the semiconductor die 108*a*, the semiconductor die 108*b*, or another semiconductor die.

The method 500 includes generating, at the first semiconductor die, a command to a second semiconductor die to initiate decryption, at 502. For example, the semiconductor die 108*a* may generate the command 266 to the semiconductor die 108*a* to initiate decryption.

The method 500 further includes outputting the command to a physical interface with the second semiconductor die, at 504. For example, the semiconductor die 108*a* may output the command 266 to the semiconductor die 108*b* via the output interface 272.

The method 500 further includes receiving data to be transferred to the second semiconductor die, at 506. For example, the semiconductor die 108*a* may receive the data 208 (e.g., at the input interface 204 and from the one or more processors 120*a*) to be transferred to the semiconductor die 108*b*.

The method 500 further includes generating, based on a key and an initial value, a keystream associated with the data, at 508. For example, the semiconductor die 108*a* may generate the keystream 246 based on the key 240 and the initial value 242.

The method 500 further includes generating encrypted data based on the data and the keystream, at 510. For example, the semiconductor die 108*a* may generate the encrypted data 264 based on the data 208 and the keystream 246.

The method 500 further includes outputting the encrypted data to the physical interface with the second semiconductor die, at 512. For example, the semiconductor die 108*a* may output the encrypted data 264 to the physical interface 150 with the semiconductor die 108*b*.

In some examples, the method 500 may further include generating an enable signal in accordance with the keystream being ready to be used to send the encrypted data and may also include sending, based on a first change in the enable signal, a start command via the physical interface prior to sending the encrypted data.

In some examples, the method 500 may further include sending a stop command to the second semiconductor die based on a second change in the enable signal after the first change. The second change may indicate that a keystream generator is disabled, the data may be encrypted after the first change and prior to the second change, and additional transferred data may be unencrypted after the second change. For example, the keystream generator 236 may be configured to generate the enable signal 248 in accordance with the keystream 246 being ready to be used to send the encrypted data 264. Further, a first change in the enable signal 248 (e.g., from logic zero to logic one, or vice versa) may indicate to send a start command (e.g., by sending the command 266 while encryption is disabled) via the output interface 272 prior to sending the encrypted data 264. A second change in the enable signal 248 (e.g., from logic one to logic zero, or vice versa) after the first change may indicate that the keystream generator 236 is disabled and may cause a stop command to be sent (e.g., by sending the command 266 while encryption is enabled). Further, the data 208 may be encrypted after the first change and prior to the second change, and additional transferred data may be unencrypted after the second change.

In some examples, encrypting the data may include performing an operation (e.g., an XOR operation using an encryption circuit based on the data and the keystream. An enable signal may be configured to force the keystream to a logic zero value to enable the encryption circuit to output unencrypted data. To illustrate, the encryption circuit 260 may be configured to perform an operation based on the data 208 and the keystream 246 to generate the encrypted data 264. The enable signal 248 may be configured to force the keystream 246 to a logic zero value to enable the encryption circuit 260 to output unencrypted data (e.g., the data 208), which may enable selective disabling of encryption.

In some examples, the method 500 may further include generating, for each subsequent data set to be encrypted and transmitted to the second semiconductor die via the physical interface, a subsequent keystream associated with the subsequent data set. For example, the semiconductor die 108a may be configured to cause the keystream generator 236 to generate, for each subsequent data set to be encrypted and transmitted to the semiconductor die 108b via the physical interface 150, a subsequent keystream associated with the subsequent data set.

In some examples, the method 500 may further include generating an activation signal in accordance with detecting one or more encryption activation criteria and may also include stalling generation of the keystream in accordance with the activation signal. For example, activation circuitry (e.g., the encryption activation circuitry 212, the decryption activation circuitry 412, or both) may be configured to detect one or more encryption activation criteria and to generate the activation signal 216 in accordance with detecting the one or more encryption activation criteria. In some examples, detecting the one or more encryption activation criteria may include performing one or more of comparing a reference source ID (e.g., a reference source ID of the one or more predetermined source IDs 320) in a local lookup table (LUT) to the source ID 156 associated with the data 208 or comparing a reference destination ID (e.g., a reference destination ID of the one or more predetermined destination IDs 324) in the local LUT with the destination ID 158 associated with the data 208. In some examples, the keystream generator 236 may be configured to receive the activation signal 216 and to stall generation of the keystream 246 in accordance with the activation signal 216.

Figure 6:
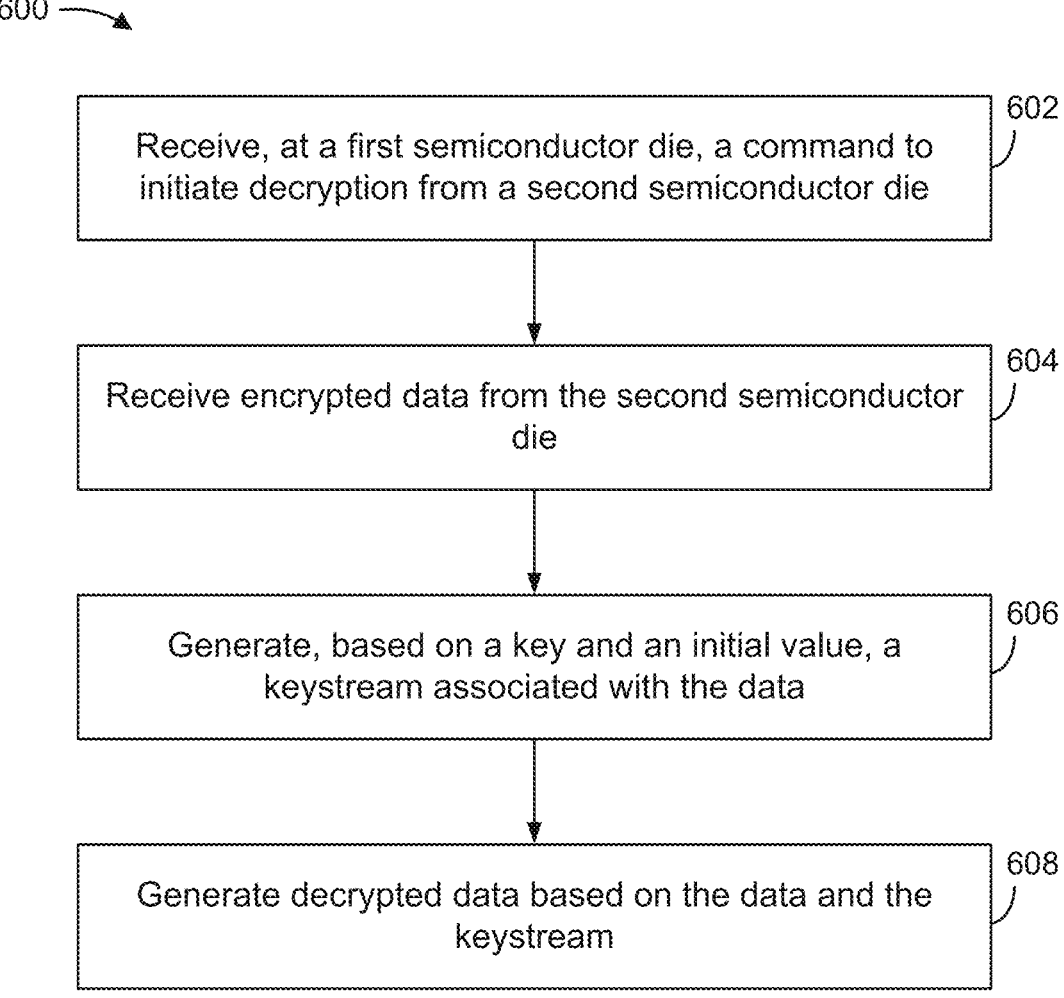
FIG. 6 is a flow chart illustrating another example of a method according to some aspects of the disclosure.

FIG. 6 is a flow chart illustrating an example of a method 600 according to some aspects of the disclosure. In some examples, operations of the method 600 may be performed by a first semiconductor die, such as the semiconductor die 108a, the semiconductor die 108b, or another semiconductor die.

The method 600 includes receiving, at the first semiconductor die, a command to initiate decryption from a second semiconductor die, at 602. For example, the semiconductor die 108b may receive the command 266 from the semiconductor die 108a.

The method 600 may further include receiving encrypted data from the second semiconductor die, at 604. For example, the semiconductor die 108b may receive the encrypted data 264 from the semiconductor die 108a.

The method 600 may further include generating, based on a key and an initial value, a keystream associated with the data, at 606. For example, the semiconductor die 108b may generate the keystream 246 based on the key 440 and the initial value 442.

The method 600 may further include generating decrypted data based on the data and the keystream, at 608. For example, the semiconductor die 108b may decrypt the encrypted data 264 using the keystream 246 to generate the data 208.

In some examples, the method 600 may include decoding the command and enabling or disabling data decryption based on the command. For example, based on receiving the command 266 during a first mode (e.g., a non-encryption mode) of the first semiconductor die, the first semiconductor die may determine that the command 266 corresponds to a start command indicating to initiate decryption. In this case, the first semiconductor die may enable decryption based on the command 266. In some other examples, based on receiving the command 266 during a second mode (e.g., an encryption mode) of the first semiconductor die, the first semiconductor die may determine that the command 266 corresponds to a stop command indicating to disable decryption. In this case, the first semiconductor die may disable decryption based on the command 266.

In some examples, the method 600 may include receiving an activation signal and generating, in accordance with the activation signal, a stall signal when decryption is enabled and the keystream is not ready. For example, the stall circuit 462 may receive the activation signal 416 and may generate, in accordance with the activation signal 416, the stall signal 464 when decryption is enabled and the keystream 246 is not ready.

In some additional aspects, in a first aspect, a semiconductor die includes an input interface configured to receive data to be transferred to at least one other semiconductor die. The semiconductor die further includes a keystream generator configured to generate a keystream based on a key and an initial value. The semiconductor die further includes encryption circuitry coupled to the keystream generator. The encryption circuitry is configured to generate a command to initiate decryption and is further configured to generate encrypted data based on the data and the keystream. The semiconductor die further includes an output interface coupled to the encryption circuitry. The output interface is configured to output the command and the encrypted data to a physical interface with the at least one other semiconductor die.

In a second aspect, in combination with the first aspect, the keystream generator is further configured to enable transferred data over a die-to-die (D2D) link to be fully encrypted or selectively encrypted.

In a third aspect, in combination with one or more of the first aspect or the second aspect, the keystream generator is further configured to generate an enable signal in accordance with the keystream being ready to be used to send the encrypted data.

In a fourth aspect, in combination with one or more of the first aspect through the third aspect, a first change in the enable signal indicates to send a start command via the output interface prior to sending the encrypted data.

In a fifth aspect, in combination with one or more of the first aspect through the fourth aspect, a second change in the enable signal after the first change indicates that the keystream generator is disabled and causes a stop command to be sent to the at least one other semiconductor die, the data is encrypted after the first change and prior to the second change, and additional transferred data is unencrypted after the second change.

In a sixth aspect, in combination with one or more of the first aspect through the fifth aspect, the semiconductor die further includes an encryption circuit that is configured to perform an operation based on the data and the keystream to generate the encrypted data, and the enable signal is configured to force the keystream to a logic zero value to enable the encryption circuit to output unencrypted data.

In a seventh aspect, in combination with one or more of the first aspect through the sixth aspect, the encryption circuitry is further configured to cause the keystream generator to generate, for each subsequent data set to be encrypted and transmitted to the at least one other semiconductor die via the physical interface, a subsequent keystream associated with the subsequent data set.

In an eighth aspect, in combination with one or more of the first aspect through the seventh aspect, the semiconductor die further includes activation circuitry configured to detect one or more encryption activation criteria and to generate an activation signal in accordance with detecting the one or more encryption activation criteria.

In a ninth aspect, in combination with one or more of the first aspect through the eighth aspect, the keystream generator is further configured to receive the activation signal and to stall generation of the keystream in accordance with the activation signal.

In a tenth aspect, in combination with one or more of the first aspect through the ninth aspect, the activation circuitry is further configured to detect the one or more encryption activation criteria by performing one or more of comparing a reference source identifier (ID) in a local lookup table (LUT) to a source ID associated with the data or comparing a reference destination ID in the local LUT with a destination ID associated with the data.

In an eleventh aspect, a semiconductor die includes an input interface configured to receive encrypted data from at least one other semiconductor die via a physical interface. The semiconductor die further includes a keystream generator configured to generate, based on a key and an initial value, a keystream associated with the encrypted data. The semiconductor die further includes decryption circuitry coupled to the keystream generator. The decryption circuitry is configured to receive a command to initiate decryption and further configured to output decrypted data based on the encrypted data, the keystream, and the command.

In a twelfth aspect, in combination with the eleventh aspect, the decryption circuitry is further configured to decode the command and to enable or disable data decryption based on the command.

In a thirteenth aspect, in combination with one or more of the eleventh aspect through the twelfth aspect, the semiconductor die further includes a stall circuit coupled to the input interface, and the stall circuit is configured to receive an activation signal and to generate, in accordance with the activation signal, a stall signal when decryption is enabled and the keystream is not ready.

In a fourteenth aspect, a method includes generating, at a first semiconductor die, a command to a second semiconductor die to initiate decryption and outputting the command to a physical interface with the second semiconductor die. The method further includes receiving data to be transferred to the second semiconductor die and generating, based on a key and an initial value, a keystream associated with the data. The method further includes generating encrypted data based on the data and the keystream and outputting the encrypted data to the physical interface with the second semiconductor die.

In a fifteenth aspect, in combination with the fourteenth aspect, the method further includes generating an enable signal in accordance with the keystream being ready to be used to send the encrypted data and sending, based on a first change in the enable signal, a start command via the physical interface prior to sending the encrypted data.

In a sixteenth aspect, in combination with one or more of the fourteenth aspect through the fifteenth aspect, sending a stop command to the second semiconductor die based on a second change in the enable signal after the first change, where the second change indicates that a keystream generator is disabled, where the data is encrypted after the first change and prior to the second change, and where additional transferred data is unencrypted after the second change.

In a seventeenth aspect, in combination with one or more of the fourteenth aspect through the sixteenth aspect, encrypting the data includes performing an operation using an encryption circuit based on the data and the keystream, and the enable signal is configured to force the keystream to a logic zero value to enable the encryption circuit to output unencrypted data.

In an eighteenth aspect, in combination with one or more of the fourteenth aspect through the seventeenth aspect, the method further includes generating, for each subsequent data set to be encrypted and transmitted to the second semiconductor die via the physical interface, a subsequent keystream associated with the subsequent data set.

In a nineteenth aspect, in combination with one or more of the fourteenth aspect through the eighteenth aspect, the method further includes generating an activation signal in accordance with detecting one or more encryption activation criteria and stalling generation of the keystream in accordance with the activation signal.

In a twentieth aspect, in combination with one or more of the fourteenth aspect through the nineteenth aspect, detecting the one or more encryption activation criteria includes performing one or more of comparing a reference source identifier (ID) in a local lookup table (LUT) to a source ID associated with the data or comparing a reference destination ID in the local LUT with a destination ID associated with the data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via processor circuitry, via executable instructions, or combinations thereof.

A hardware and data processing apparatus used to implement one or more illustrative logics, logical blocks, modules, and circuits described herein may be implemented or performed with a single-or multi-chip processor, a digital signal processor (DSP), an application specific integrated circuit (ASIC), a field programmable gate array (FPGA) or other programmable logic device, discrete gate or transistor logic, discrete hardware components, or any combination thereof. A processor may be a microprocessor, controller, microcontroller, state machine, or other processor. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, one or more functions may be stored on or transmitted over as one or more instructions or code on a computer-readable medium. The operations of a method or process disclosed herein may be implemented in a processor-executable software module which may reside on a computer-readable medium. Computer-readable media includes computer storage media. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A semiconductor die comprising:
an input interface configured to receive data to be transferred to at least one other semiconductor die;

a keystream generator configured to generate a keystream based on a key and an initial value;

encryption circuitry coupled to the keystream generator and configured to generate a command to initiate decryption and further configured to generate encrypted data based on the data and the keystream; and an output interface coupled to the encryption circuitry and configured to:

output, to a physical interface with the at least one other semiconductor die, the command as a start command indicating that the at least one other semiconductor die is to initiate the decryption;

output, to the physical interface the encrypted data; and output, to the physical interface, the command as a stop command indicating that the at least one other semiconductor die is to stop the decryption.

2. The semiconductor die of claim 1, wherein the keystream generator is further configured to enable transferred data over a die-to-die (D2D) link to be fully encrypted or selectively encrypted.

3. The semiconductor die of claim 1, wherein the keystream generator is further configured to generate an enable signal in accordance with the keystream being ready to be used to send the encrypted data.

4. The semiconductor die of claim 3, wherein a first change in the enable signal indicates to send the command as the start command via the output interface prior to sending the encrypted data.

5. The semiconductor die of claim 4, wherein a second change in the enable signal after the first change indicates that the keystream generator is disabled and indicates to resend the command as the stop command to the at least one other semiconductor die, wherein the data is encrypted after the first change and prior to the second change, and wherein additional transferred data is unencrypted after the second change.

6. The semiconductor die of claim 4, further comprising an encryption circuit configured to perform an operation based on the data and the keystream to generate the encrypted data, wherein the enable signal is configured to force the keystream to a logic zero value to enable the encryption circuit to output unencrypted data.

7. The semiconductor die of claim 1, wherein the encryption circuitry is further configured to cause the keystream generator to generate, for each subsequent data set to be encrypted and transmitted to the at least one other semiconductor die via the physical interface, a subsequent keystream associated with the subsequent data set.

8. The semiconductor die of claim 1, further comprising activation circuitry configured to detect one or more encryption activation criteria and to generate an activation signal in accordance with detecting the one or more encryption activation criteria.

9. The semiconductor die of claim 8, wherein the keystream generator is further configured to receive the activation signal and to stall generation of the keystream in accordance with the activation signal.

10. The semiconductor die of claim 8, wherein the activation circuitry is further configured to detect the one or more encryption activation criteria by performing one or more of:

comparing a reference source identifier (ID) in a local lookup table (LUT) to a source ID associated with the data; or comparing a reference destination ID in the local LUT with a destination ID associated with the data.

11. A semiconductor die comprising:

an input interface configured to receive encrypted data from at least one other semiconductor die via a physical interface;

a keystream generator configured to generate, based on a key and an initial value, a keystream associated with the encrypted data; and decryption circuitry coupled to the keystream generator and configured to:

receive, from the at least one other semiconductor die via the physical interface, a command as a start command indicating to initiate decryption;

output decrypted data based on the encrypted data, the keystream, and the command; and receive, from the at least one other semiconductor die via the physical interface, the command as a stop command indicating to stop the decryption.

12. The semiconductor die of claim 11, wherein the decryption circuitry is further configured to decode the command and to enable or disable the decryption based on the command.

13. The semiconductor die of claim 11, further comprising a stall circuit coupled to the input interface, wherein the stall circuit is configured to receive an activation signal and to generate, in accordance with the activation signal, a stall signal when the decryption is enabled and the keystream is not ready.

14. A method comprising:

generating, at a first semiconductor die, a command to a second semiconductor die to initiate decryption;

outputting, to a physical interface with the second semiconductor die, the command as a start command indicating that the second semiconductor die is to initiate the decryption;

receiving data to be transferred to the second semiconductor die;

generating, based on a key and an initial value, a keystream associated with the data;

generating encrypted data based on the data and the keystream;

outputting the encrypted data to the physical interface with the second semiconductor die; and outputting, to the physical interface, the command as a stop command indicating that the second semiconductor die is to stop the decryption.

15. The method of claim 14, further comprising generating an enable signal in accordance with the keystream being ready to be used to send the encrypted data, wherein the command is output, based on a first change in the enable signal, as the start command via the physical interface prior to sending the encrypted data.

16. The method of claim 15, wherein the command is output as the stop command to the second semiconductor die based on a second change in the enable signal after the first change, wherein the second change indicates that a keystream generator is disabled, wherein the data is encrypted after the first change and prior to the second change, and wherein additional transferred data is unencrypted after the second change.

17. The method of claim 15, wherein encrypting the data includes performing an operation using an encryption circuit based on the data and the keystream, wherein the enable signal is configured to force the keystream to a logic zero value to enable the encryption circuit to output unencrypted data.

18. The method of claim 14, further comprising generating, for each subsequent data set to be encrypted and transmitted to the second semiconductor die via the physical interface, a subsequent keystream associated with the subsequent data set.

19. The method of claim 14, further comprising:
generating an activation signal in accordance with detecting one or more encryption activation criteria; and
stalling generation of the keystream in accordance with the activation signal.

20. The method of claim 19, wherein detecting the one or more encryption activation criteria includes performing one or more of:
comparing a reference source identifier (ID) in a local lookup table (LUT) to a source ID associated with the data; or
comparing a reference destination ID in the local LUT with a destination ID associated with the data.

* * * * *